Feb. 9, 1932. J. JULIAN 1,843,924
AUTOMOBILE THEFT ALARM SWITCH
Filed Nov. 4, 1929
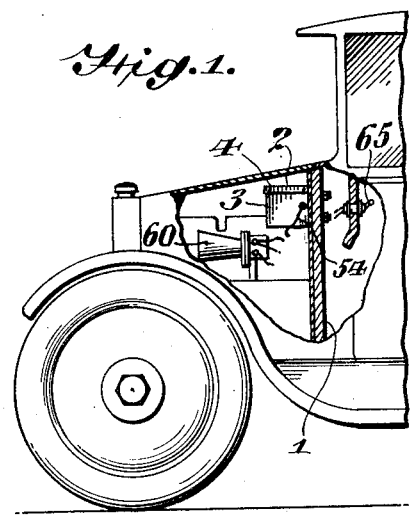
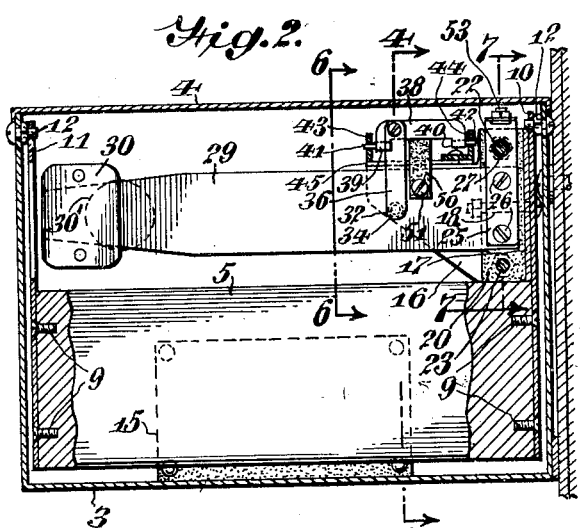
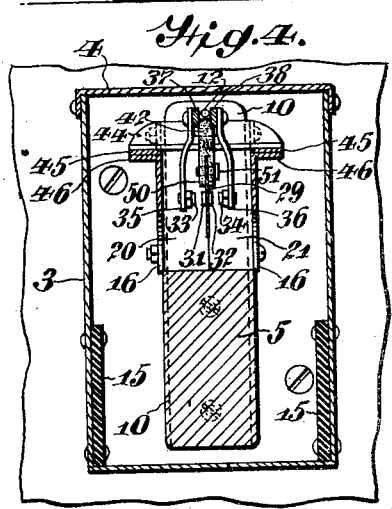
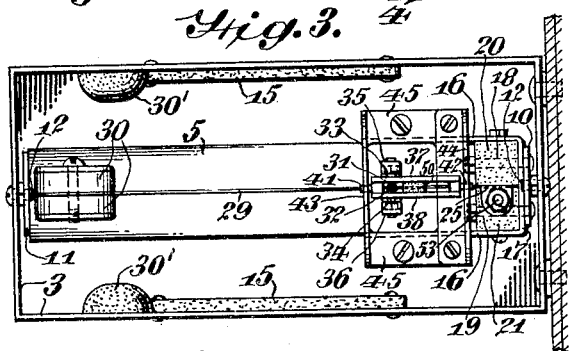
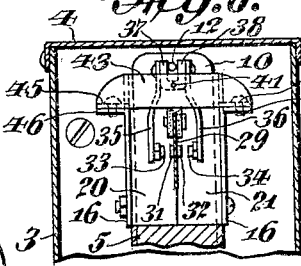
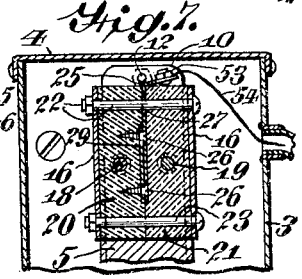
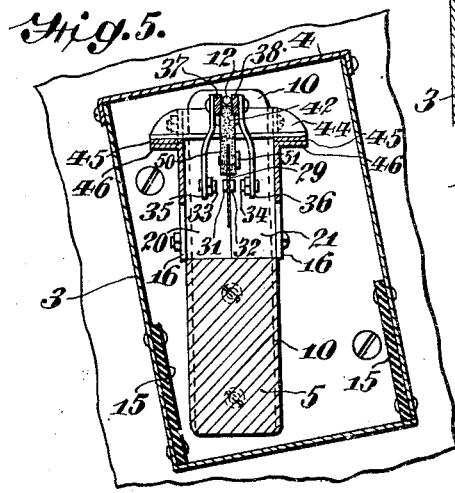
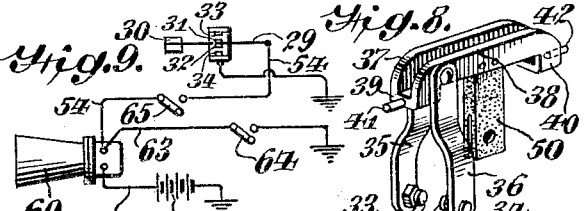
INVENTOR
James Julian
BY Cyrus N. Anderson
ATTORNEY Patented Feb. 9, 1932

1,843,924

UNITED STATES PATENT OFFICE

JAMES JULIAN, OF PHILADELPHIA, PENNSYLVANIA

AUTOMOBILE THEFT ALARM SWITCH

Application filed November 4, 1929. Serial No. 404,546.

My invention relates to automobile theft alarms and it has for its general object to provide a device having novel means embodied therein whereby its operation is assured regardless of the position of an automobile or other vehicle upon which it may be provided.

It also is an object of the invention to provide an electrically actuated alarm device for automobiles having novel means embodied therein whereby the device is rendered extremely sensitive to motions or movements of an automobile or the like upon which it may be located.

To the foregoing and other ends the invention comprehends the construction as hereinafter described in detail, particularly pointed out in the claims and as illustrated in the accompanying drawings wherein I have shown a preferred form of device embodying the said invention.

In the drawings:

Fig. 1 is a view in sectional side elevation of an automobile provided with a device embodying the invention, the said device being shown in side elevation and mounted upon a front vertical wall of the automobile body;

Fig. 2 is a vertical longitudinal sectional view of a device embodying the invention;

Fig. 3 is a transverse horizontal sectional plan view of the device;

Fig. 4 is a vertical transverse sectional view of the device taken on the line 4—4 of Fig. 2;

Fig. 5 is a similar view with the parts occupying different positions from those shown in Fig. 4;

Fig. 6 is a vertical transverse sectional view of a portion of the device taken on the line 6—6 of Fig. 2;

Fig. 7 is a vertical transverse sectional view taken on the line 7—7 of Fig. 2;

Fig. 8 is a view in perspective showing an oscillatable element embodied in the device, the said element carrying a couple of oscillating contacts; and Fig. 9 is a schematic view showing the circuit embodied in the device.

In the drawings I have shown at 1 the front portion of an automobile upon which is mounted as indicated at 2 a device embodying my invention. Although reference is made to automobiles as the vehicles upon which devices embodying my invention may be placed it is to be understood that the said device embodying my invention is adapted for application to and use upon vehicles of various kinds and types and is not limited to automobiles.

The device of my invention comprises a box 3 which preferably should be closed by means of a lid or cover 4 by means which may be opened only by the owner of the car or someone with a right to have access to the interior of the said box. A pendulum is mounted within the said box, said pendulum comprising a weight 5 which extends lengthwise of the box and the lower side of which is spaced a short distance from the bottom of the said box. The weight 5 is secured by means of fastening screws 9 to the lower end portions of suspension bars or strips 10 and 11 which are pivotally supported at their upper ends upon pivots 12 which are mounted in openings in the opposite ends of the box and near the upper edges thereof as is shown in Fig. 2 of the drawings. The pendulum oscillates during the operation or movement of a car upon which the device may be mounted, such oscillations being due to the vibrations of the car, and in order to deaden the noise of the striking of the pendulum against the opposite sides of the box or container I have provided the said sides with cushioning strips or pads 15. These pads consisting of rubber, felt or other suitable material operate to deaden the noise which otherwise would be occasioned by the striking of the pendulum against the sides of the box or container during the operation of an automobile upon which the device may be located.

For the purpose of supporting movable contacts which operate to open and close rapidly and alternately an electric circuit to which reference will be made hereinafter I have provided a U-shaped metallic member having sides 16 and a connecting end portion 17, the latter of which is secured to the suspension strip or bar 10 by means of bolts 18 and 19 which extend through the said connecting end portion 17 and also through blocks 20 and 21 of insulating material which are located in parallel relation to each other inside of the sides 16 of the movable contact suport.

For the purpose of further securing the insulating blocks 20 and 21 to the sides 16 I have provided crosswise extending bolts 22 and 23 which extend through the oppositely disposed sides 16 and through the blocks 20 and 21 near the upper and lower ends thereof as is shown clearly in Fig. 7. A narrow metal strip 25 extends from the top downwardly between the insulating blocks 20 and 21 and is secured to the block 20 by means of screws 26. The fastening bolt 22 previously referred to extends through an opening 27 in the said metal strip 25, the diameter of which opening being of sufficient size to prevent contact of the edge thereof with the said bolt. The fastening screws 26 also engage openings in the rear end portion of the relatively stationary end portion of a thin resilient oscillatable metal contact plate 29. By these screws the relatively stationary end portion of the said plate 29 is fixedly secured to the insulating block 20 and also to the metal strip 25. The opposite or outer oscillating end of the resilient metal strip 29 is provided with a weight 30 so that when movement is imparted to the said strip it oscillates somewhat as a pendulum. Cushioning means 30' are provided on the inner sides of the side walls of the box 3 with which the weight 30 may contact during the oscillation of the said strip.

The plate 29 is provided with contacts 31 and 32 upon its opposite sides which, due to the oscillation of said plate, make contact alternately with contacts 33 and 34. The contacts 33 and 34 are mounted upon the inner sides of depending arms 35 and 36 the upper ends of which are rigidly connected with or secured to a pivoted bridge member comprising, in the construction as illustrated, two parallel metal bars or strips 37 and 38 connected at their opposite ends and extended downwardly as indicated at 39 and 40. The opposite downwardly extending end portions 39 and 40 of the said member are provided with pivots or pintles 41 and 42 which are pivoted in openings provided in vertically extending plates 43 and 44. In the construction as illustrated the vertically extending plate 43 is integral with the narrow side plates 45 which are mounted upon laterally and outwardly extending flanges 46 provided at the upper edges of the opposite sides 16 of the contact supporting member. The vertical plate 44 consists of the vertically extending flange of an angle plate the other flange of which is secured to the inner or rear ends of the side plates 45. It will be noted that the upper ends of the depending contact supporting arms are connected to the parallel metal bars or strips at points above the axes of the pivots or pintles 41 and 42.

The oscillatable plate 29 carrying the contacts 31 and 32 is rigidly connected by means of a bar 50 of insulating material with the metal strips or bars 37 and 38. In the construction as illustrated the rigid connection between the plate 29 and the parallel strips or bars 37 and 38 consists entirely of insulation but obviously this is unnecessary, it being only necessary that the rigid connection between the plate 29 and the strips or bars 37 and 38 shall have means for insulating the said plate from the said bars. The rigid connection 50 is secured to the plate 29 by means of a fastening screw 51.

The upper end of the metal strip 25 previously referred to is provided with a binding post 53 to which one end of an electric conductor 54 is connected as indicated in Fig. 7. The conductor 54 is part of a branch line leading from the electric circuit having connection with the actuating means of a sounding horn 60. Current for actuating the sounding means of the sounding horn is supplied from a suitable source such as a battery 61 one side of which is connected by a conductor 63 to the sounding means of the horn and from the latter a conductor as indicated at 63 extends to ground. The other side of the battery is grounded. Normally the switch indicated at 64 in the conductor 63 is open but upon closing the same sounding of the horn 60 is effected. The conductor 54 previously referred to consists of a branch line leading from the circuit which includes the sounding means of the horn 60. The said line 54 is provided with a switch 65 which during the operation of an automobile or the like is in open position but when the automobile has been stopped and the chauffeur or driver thereof leaves the same he may close the switch 65. Such closure closes the circuit from the battery 61 through the line 54 to the metal strip 25. The latter is connected to the oscillatable plate 29. If it should happen that someone should undertake to steal a car provided with the device movement of the car to the least extent would cause vibration of the plate 29 so that the contacts 31 and 32 would contact alternately with the contacts 33 and 34 and thus alternately make and break the circuit including the conductor 54. The branch 54 is grounded through either of the contacts 31 or 32 as indicated in Fig. 9 of the drawing.

The device embodying the invention may be mounted at any point upon an automobile or other vehicle but preferably it should be mounted in some concealed position.

In the construction as illustrated the usual horn with which automobiles and the like are provided is employed in connection with the device of my invention and for giving signals in case anyone should molest a car with the idea of stealing the same, but if desired the sounding element may be other than the usual sounding horn, and the battery for supplying current for actuating the theft alarm sounding element may be a different battery from that employed in connection with the usual sounding horn, and the electric circuit employed in connection with the theft alarm device may be entirely separate from that employed in connection with the usual sounding horn. The device may be and preferably should be located at some concealed point in or upon the structure of the car although such concealment is not necessary as the closure for the container within which the sounding means is located may be so fastened that it cannot be opened except by someone provided with the proper means for effecting its opening.

By the employment of a swinging weight or pendulum structure as described I have provided means whereby the oscillatable contact plate 29 or its equivalent is not likely, upon movement into any particular position, to remain in such position. The tendency of the pendulum device comprising the weight 5 is to assume a position vertically below the pivots by which it is supported so that the tendency of the said pendulum device is to return the said plate 29 into and retain it in operative position.

In view of the fact that the oscillatable plate 29 is rigidly connected by the connection 50 to the pivotally mounted support for the contacts 33 and 34 it follows that as the plate 29 oscillates it causes pivotal movement of the said contact support about the pintles or pivots 41 which causes swinging movements of the contacts 33 and 34 respectively toward and from the contacts 31 and 32 upon the resilient oscillatable plate 29. The movements of the contacts 33 and 34 and of the support therefor with respect to the contacts 31 and 32 upon the plate 29 may best be explained by reference to Fig. 4 of the drawings. Upon movement of the plate 29 toward the right, having reference to said Fig. 4, the support for the contact arms 35 and 36 is moved about its pivot in a like direction with the result that the contact 34 is moved in a direction opposite that in which the contact 32 is moved. If the plate 29 be moved in the opposite direction, that is toward the left, having reference to Fig. 4, the movement of the pivoted support for the arms 35 and 36 is in the opposite direction with the result that the arm 35 is moved to the right carrying the contact 33 in a like direction. The movements of the contacts 33 and 34 in opposite directions to the movements of the contacts 31 and 32 when contact is made causes the said contacts to come together more quickly than otherwise would be the case.

By pivotally supporting the oscillatable resilient plate 29 which carries the contacts 31 and 32 and also pivotally supporting the contacts 33 and 34 and providing means whereby the latter move in directions the opposite to that in which the contacts 31 and 32 are moved I have provided a device which is very sensitive in operation and very effective in giving warning signals should anyone not having the right to do so interfere with an automobile for the purpose of stealing the same or for any other purpose.

It will be understood that the device is operated only when the switch 65 is moved into closed position. It follows, therefore, that if the operative of an automobile or other like vehicle should leave the same he should upon leaving close the switch 65. If the same be closed the automobile or car cannot be stolen without the device of my invention signalling that the car is being interfered with.

Having thus described my invention, what I claim and desire to secure by Letters Patent is:

1. In a theft alarm device for automobiles and the like the combination of a pendulum, an oscillatable member mounted on the said pendulum and extending in a direction transverse of the path of oscillatory movement of the said pendulum, and electric contacts mounted upon the said pendulum and located upon opposite sides of the said oscillatable member with which the latter is adapted to contact.

2. In a theft alarm device for automobiles and the like the combination of a pendulum, an oscillatable flexible and resilient sheet metal strip mounted upon said pendulum, electric contacts located upon opposite sides of said oscillatable resilient member, and pivotally supported means mounted upon the said pendulum for supporting the said electric contacts.

3. In a theft alarm device for automobiles and the like the combination of a pendulum, an oscillatable flexible and resilient metal strip connected at one end to said pendulum and supported thereby, means for insulating the said metal strip from the said pendulum, electric contacts supported upon opposite sides of said metal strip in adjoining relation to its pivoted end, pivoted means for supporting said electric contacts, and a rigid connection between the said pivoted means and the said oscillatable resilient metal strip.

4. In a theft alarm device for automobiles and the like the combination of a pendulum device, a flexible resilient strip, means for rigidly connecting one end of said strip to the said pendulum device, said means supporting said strip in a horizontal position, electric contacts located on opposite sides of said strip, a support for the said electric contacts, and means for pivotally supporting the said support upon the said pendulum device to permit pivotal movements thereof independently of the oscillatory movements of the said pendulum device.

5. In a theft alarm device for automobiles and the like the combination of a pendulum device, an oscillatable flexible resilient spring metal strip, means for securing one end of said strip to the said pendulum device, electric contacts located in position for contact with the said strip upon oscillation of the latter, means for pivotally supporting the said electric contacts, and means operating upon oscillation of the said strip to cause simultaneous swinging movements of the said electric contacts in directions opposite to the oscillatory movements of the said strip.

6. In a theft alarm device for automobiles and the like the combination of a pendulum device, an oscillatable thin flexible resilient strip of metal, means for rigidly connecting one end of said strip to the said pendulum device, electric contacts located in position relative to the said strip to have contact therewith upon oscillation thereof, a bar having its opposite ends extended downwardly, means for pivotally supporting said ends, the axes of the pivots being located below the said bar, a rigid connection between the said oscillatable strip and the said bar, the point of engagement of said rigid connection with said bar being above the axes of the pivots whereby upon oscillatory movements of the said strip pivotal movements of said supporting bar is caused in directions corresponding to the oscillatory movements of the said strip to effect swinging movements of the said electric contacts simultaneously with and in directions opposite to that of the oscillatory movements of the said strip.

7. In a theft alarm device for automobiles and the like the combination of a weight of substantial length as compared with its width, suspension strips having connection with said weight at its opposite ends and projecting laterally and upwardly therefrom, relatively stationary pivots having pivotal engagement with the upper ends of the said suspension strips, an oscillatable flexible resilient metal strip, means for rigidly connecting one end of said oscillatable strip to one of the said suspension strips and supporting the said oscillatable strip above and in substantially parallel relation to the said weight, said strips having electric contacts carried thereby, electric contacts located upon the opposite sides of said strip and adapted to contact with the contacts carried by said strip, a bar for supporting the second named contacts, the opposite ends of said bar extending downwardly, pivots for supporting the opposite downwardly extending ends of the said bar, the axes of said pivots being located below the longitudinal axial line of the said bar, means for rigidly connecting the said oscillatable strip with the said bar at a point intermediate its ends whereby oscillations of the said strip cause pivotal movements of the said bar to effect swinging movements of the second named contact.

In testimony that I claim the foregoing as my invention, I have hereunto signed my name this 31st day of October, A. D. 1929.

JAMES JULIAN.